United States Patent [19]

Chevalier et al.

[11] Patent Number: 5,812,090
[45] Date of Patent: Sep. 22, 1998

[54] METHOD AND DEVICE ENABLING A MODEM TO BE SYNCHRONIZED WITH AN RF DIGITAL DATA TRANSMITTER IN THE PRESENCE OF JAMMERS

[75] Inventors: Pascal Chevalier; Francois Pipon, both of Paris, France

[73] Assignee: Thomson-CSF, Paris, France

[21] Appl. No.: 882,831

[22] Filed: Jun. 27, 1997

Related U.S. Application Data

[63] Continuation of Ser. No. 375,288, Jan. 20, 1995, abandoned.

[30] Foreign Application Priority Data

Jan. 21, 1994 [FR] France ................................. 94 00634

[51] Int. Cl.⁶ ........................................................ G01S 3/16
[52] U.S. Cl. ............................ 342/378; 342/380; 342/383
[58] Field of Search ..................................... 342/378, 380, 342/383

[56] References Cited

U.S. PATENT DOCUMENTS

| | | | |
|---|---|---|---|
| 4,752,969 | 6/1988 | Rilling | 455/278 |
| 5,144,322 | 9/1992 | Gabriel | 342/383 |
| 5,481,505 | 1/1996 | Donald et al. | 367/130 |

FOREIGN PATENT DOCUMENTS 41 30 863 A1  3/1993  Germany .

OTHER PUBLICATIONS

IEEE Transactions On Aerospace and Electronic Systems, vol. AES 18. No. 1, Jan. 1982 "An Adaptive Array Signal Processing Algorithm for Communications", by Lawrence E. Brennan and Irving S. Reed, pp. 124–129.

*Primary Examiner*—Thomas H. Tarcza
*Assistant Examiner*—Dao L. Phan
*Attorney, Agent, or Firm*—Oblon, Spivak, McClelland, Maier & Neustadt, P.C.

[57] ABSTRACT

The method consists in estimating the matrix of correlation $\hat{R}_{xx}$ of the signals received on a set of N reception sensors, computing the reverse correlation matrix $\hat{R}_{xx}^{-n}$, computing vectors of intercorrelation $\hat{r}_{xd}$ between the signals received on the set of the N sensors and a known replica signal d(k), computing a criterion of synchronization in calculating the products of the conjugate, transposed intercorrection vectors $\hat{R}_{xx}^{-n}$ and of the matrix of the intercorrelation vector $r_{xdi}$ and comparing the value of the criterion obtained with a determined threshold value 1 to place the synchronization on the sample for which the value of the criteria exceeds the threshold value η. To estimate the Doppler shift the synchronization sequence is subdivided into a determined number of sections of symbols to carry out fast Fourier transform computations on determined intercorrelation vectors in each section.

8 Claims, 4 Drawing Sheets

METHOD AND DEVICE ENABLING A MODEM TO BE SYNCHRONIZED WITH AN RF DIGITAL DATA TRANSMITTER IN THE PRESENCE OF JAMMERS

This application is a continuation of application Ser. No. 08/375,288, filed on Jan. 20, 1995, now abandoned.

BACKGROUND OF THE INVENTION

The present invention relates to a method and device enabling a modem to be synchronized with an RF digital data transmitter notably in the presence of jammers or interference units.

In RF digital data transmission systems, the synchronization is obtained, from sequences of symbols known to the receiver and interposed between the information symbols, by correlation between the received signal and a reference signal prepared from the known symbol. The result is compared with a threshold to decide on the synchronization. Systems enabling the synchronization of a modem from a single sensor and a single receiver are, for example, known from the article by D. V. Sarwate and M. B. Pursely, "Cross-correlation properties of pseudo-random and related sequences" in IEEE, Vol. 66, pp. 593–619, May 1980. However the techniques implemented, which furthermore enable an estimation of the characteristics of the transmission channel, soon become ineffective in the presence of jamming.

When the signal-to-noise ratio is not sufficient for synchronization by a single-sensor technique, techniques designed to increase the signal-to-noise ratio and enable synchronization are used.

These techniques may be grouped into two classes. A first class of techniques is aimed at pre-processing the received signal before carrying out the synchronization of the pre-processed signal. The second class of techniques is aimed at carrying the tasks of improving the signal-to-noise ratio and of synchronization jointly.

In techniques belonging to the first class, it is also necessary to distinguish between two categories:

A first category of techniques implements a single-sensor pre-processing technique of the jammer excision type before carrying out the synchronization. This processing is known, for example, from the article by L. B. Milstein, "Interference rejection techniques in spread-spectrum communications", in Proc. IEEE, Vol. 76, pp. 657–661, Jun. 1988. According to this article, it is sought to predict the contribution of the jammer whose band is assumed to be smaller than the band of the signal without predicting the contribution of the useful signal. This makes it possible to improve the performance characteristics of the synchronization in the presence of narrow-band interference (of the FSK type). However the processing remains inefficient when there is jamming that occupies the entire band used by the useful signal. This is partly due to the fact that the single-sensor pre-processing techniques do not enable a processing of the signals except in a space limited to the time axis and to the frequency axis.

The second category relates to techniques implementing a rejection multi-sensor pre-processing operation preceding the synchronization step itself. The idea is to carry out a spatial filtering that discriminates between the signal and the jammers by their direction of arrival, the time, the spectrum or the power as described in R. A. Monzingo, T. W. Miller, *Introduction To Adaptive Arrays*, 1980, John Wiley and Sons, New York, and P. Chevalier, *Antenne adaptative: d'une structure linéaire `a une structure non linéaire de Volterra* ("Adaptive antenna: from a linear structure to a non-linear Volterra structure"), doctoral thesis, Université de Paris Sud, Jun. 1991, and then to correlate the reference signal with the output of the antenna. The spatial filtering techniques discriminating between the signal and the jammers by time, spectrum or power are generally sub-optimal while those using the knowledge of the direction of the arrival of the signal require the implementation of a goniometrical technique that is costly and difficult to use in the high frequency range notably because of multipath transmissions.

For these reasons, the techniques belonging to the second class in which it is sought to reject the jamming signals and carry out the synchronization jointly, on the basis of knowledge of the reference signal, appear to be more promising. A technique such as this has been proposed, for example, by M. Compton in an article, "An adaptive array in a spread-spectrum communication system", in Proc. IEEE, Vol. 66, pp. 289–298, Mar. 1978, for the synchronization of PN signals using an analog structure integrating delay lock loops.

A second technique has been proposed by L. E. Brennan and I. S. Reed in "An adaptive array signal processing algorithm for communications" in IEEE Trans-Aero-Syst., Vol. AES-18, No. 1, pp. 124–130, June 1982 for digital transmissions, and has been further developed by D. M. Duglos and R. A. Scholtz in an article "Acquisition of spread-spectrum signals by an adaptive array" in IEEE Trans-Acous-Speech-SignalProc., Vol. ASSP-37, No. 8, pp. 1253–1270, Aug. 1989. These techniques appear however to be far costlier than the single-sensor techniques and are unfortunately inapplicable as such in the presence of the Doppler shifts of the signal that are inherent in ionospheric transmission.

SUMMARY OF THE INVENTION

The aim of the invention is to overcome the above-mentioned drawbacks.

To this end, an object of the invention is a method enabling a modem to be synchronized with an RF digital signal transmitter in the presence of jammers comprising the steps of:
  estimating the matrix of correlation $R_{XX}$ of signals received on a set of N reception sensors by blocks formed by a number of samples of a synchronization sequence transmitted by the transmitter,
  computing the reverse correlation matrix $\hat{R}_{XX}^{-n}$,
  computing vectors of intercorrelation $\hat{r}_{Xd}$ between the signals X(k) received on the set of the N sensors and a known replica signal d(k),
  computing a criterion of synchronization calculating the scalar product between the intercorrelation vector $r_{Xd}$ and the vector obtained by the product of the reverse of the correlation matrix $\hat{R}_{XX}^{-n}$ and the intercorrelation vector $r_{Xd}$,
  comparing the value of the criterion obtained with a determined threshold value η to place the synchronization on the sample for which the value of the criteria exceeds the threshold value η,
  wherein, in order to estimate the Doppler shift inherent in the communications between transmitters and receivers, said method comprises the steps of:
  subdividing the synchronization sequence into a determined number of M sections of $k_0$ symbols, carrying out computations, on these sections, of partial intercorrelation vectors $\hat{r}_{X_d}$ (i=1,...,M) in such a way that, on each of the sections of $k_0$ symbols, the Doppler shift causes the phase to rotate by a value of less than 90°, carrying out fast Fourier transform (FFT) computations on the vectors $\hat{r}_{X_{di}}$ obtained, and computing a value of the synchronization criterion from the vectors $\hat{r}_{X_d}^{(k\Delta f)}$, obtained as a result of the fast Fourier transform computations and the correlation matrix $\hat{R}_{XX}$.

An object of the invention is also a device for the implementation of the method.

The method and the device according to the invention have the advantage of enabling, all at the same time, the synchronization of a modem under conditions of severe jamming and in the presence of multiple paths, the estimation of the frequency drift between the transmitter and the receiver and the detection of the instants of arrival of all the multipath transmissions associated with the useful signal, provided that these multipath transmissions have sufficiently high power with respect to the power of the background noise.

BRIEF DESCRIPTION OF THE DRAWINGS

Other features and advantages of the invention shall appear from the following description made with reference to the appended figures, of which.

DETAILED DESCRIPTION OF THE INVENTION

The method of synchronization implemented by the invention makes use of known techniques of single-sensor synchronization to apply them to the making of adaptive antennas working with replica signals.

According to the single-sensor synchronization technique, the criterion of synchronization C(n) is obtained by computing the correlation y(n) between K known symbols in a synchronization sequence and the K samples that follow the arrival of a sample n at the sensor, in standardizing the results by the power p(n) of the received signal. These computations are performed by applying the relationships:

$$y(n) = \frac{1}{K} \sum_{k=1}^{K} x(k+n)d^*(k) \quad (1)$$

$$p(n) = \frac{1}{K} \sum_{k=1}^{K} x(k+n)x^*(k+n) \quad (2)$$

$$C(n) = \frac{|y(n)|^2}{p(n)} \quad (3)$$

where:

x(k) is the signal coming from the sensor used, d(k) is the known replica signal (K symbols placed at the beginning of the frame),

* represents the operation of conjugation on the complex numbers.

These computations are reiterated for each sample n, and when the criterion C(n) goes beyond a certain threshold η, depending on the probability of a false alarm, the synchronization is decided upon. The instant of synchronization is determined by the rank of the sample no for which $C(n_0) > \eta$. The standardization by the power p(n) enables the choice of a threshold independent of the level of signal received.

In this method, the synchronization is obtained when the signal-to-noise ratio is sufficient. Its performance characteristics depend partly on the number of samples taken into account for the correlation. However, in the presence of strong jammers, the synchronization cannot be done.

The idea implemented in the invention consists then in making the synchronization, at the output of an adaptive antenna processing operation, enabling the rejection of the jammers.

Figure 1:
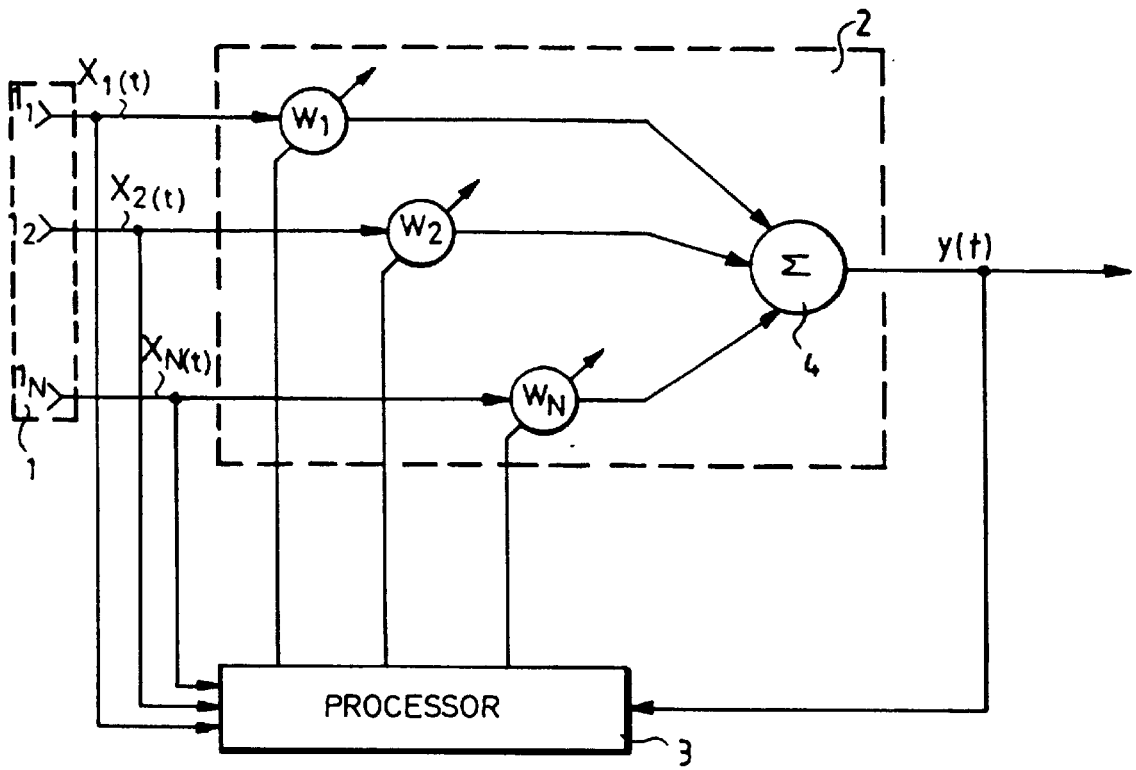
FIG. 1 shows a functional diagram of an adaptive antenna according to the invention.

The functional diagram of an adaptive antenna is shown in FIG. 1, said antenna comprising an array 1 of N sensors $1_1, \ldots, 1_N$, an array of adaptive filters 2 (constituted by amplitude-phase weighting circuits, finite impulse response FIR or infinite pulse response IIR filters) coupled with an adaptive control processor 3. The processor 3 computes the coefficients $W_1$ to $W_N$ of the array of filters 2 to adapt it to the useful signal and to the jammers in the absence of any a priori knowledge of the jammers and on the basis of minimum information on the useful signal. The coefficients $W_1$ to $W_N$ enable the formation of a hole in the radiation pattern of the antenna array in the direction of the jammers while at the same time keeping a certain gain in the direction of the useful signal.

Different types of information on the useful signal are used by the adaptive antenna. This information is spatial when the direction of arrival of the useful signal is known or temporal when the instants of presence and absence of a useful signal are known, for example in frequency-hopping mode. Or again it may pertain to the waveform when there is information available on the modulation of the useful signal to have available of the useful signal by the interposing, for example, of known sequences in the useful frame or it may be spectral information when the useful signal occupies a certain frequency band and when the jammers occupy a wider frequency band. Finally, the information on the useful signal may be statistical to separate the different sources reaching the network through the use, for example, of 4th order statistics of the signals, assuming that the different signals are statistically independent.

Figure 2:
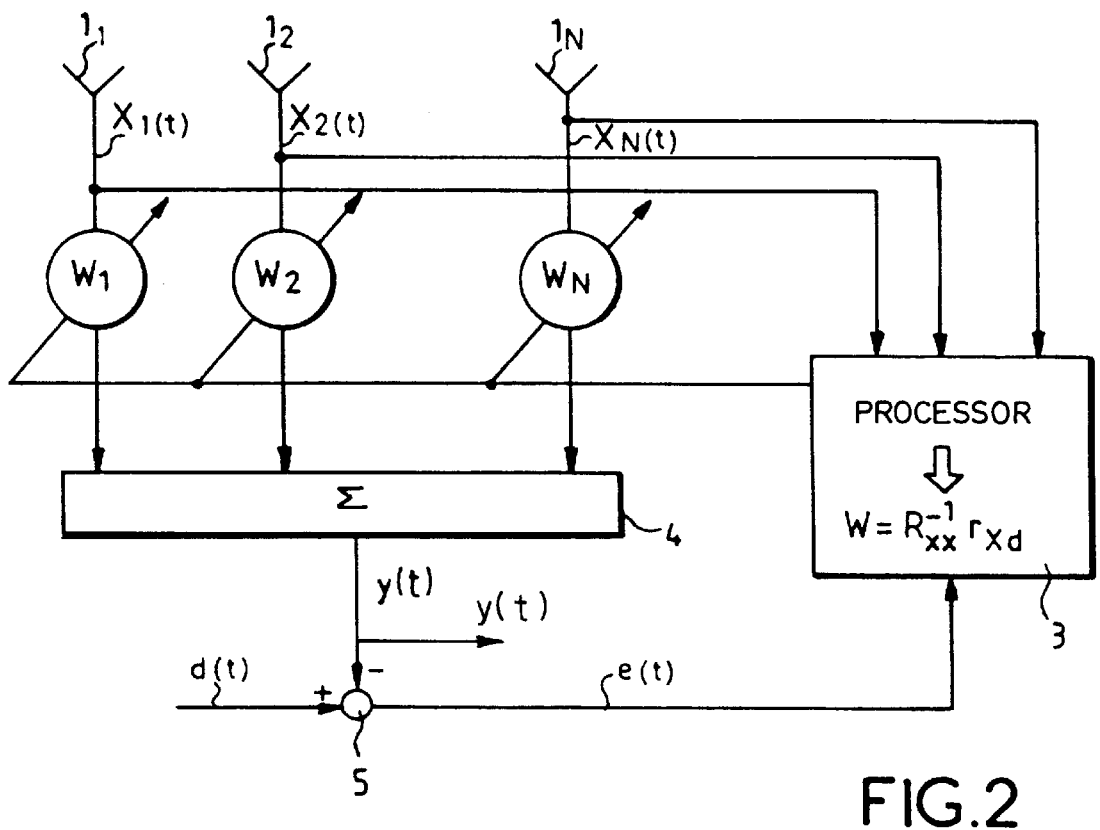
FIG. 2 exemplifies an implementation of a spatial adaptive filter with discrimination by modulation for the making of an adaptive antenna according to the invention.

In the case of the adaptive antenna shown in FIG. 2, the information on the useful signal is constituted by the sequences of known symbols interposed in the frame between the sequences of information symbols. The filters placed at output of each of the sensors $1_1$ to $1_N$ are formed respectively by circuits $W_1$ to $W_N$ for the amplitude-phase weighting of the signals $x_1(t)$ to $x_n(t)$ given by the sensors. The signals obtained at the output of the weighting circuits are applied to a summation circuit 4. The characteristics of the network of filters 2 are computed by minimizing an estimated mean square error (MSE) $\hat{\xi}$ between a replica signal d(k) and the signal y(k) coming out of the antenna in the manner shown schematically in FIG. 2 where the elements homologous to those of FIG. 1 are identified with the same references, $\hat{\xi}$, being defined by the relationship:

$$\hat{\xi} = \sum_{k=1}^{K} |y(k) - d(k)|^2 = \sum_{k=1}^{K} |W^t X(k) - d(k)|^2 \quad (4)$$

where:

y(k) is the output of the adaptive antenna and is defined by:

$$y(k) = W^t X(k) \quad (5)$$

W is the weight vector defining the adaptive antenna, $W^t$ being the corresponding conjugate transposed vector (the sign t as a superscript defines the corresponding operator), X(k) is the vector formed by the signals received on the sensors, d(k) is the known replica signal.

The difference y(k)–d(k) is obtained in FIG. 2 at the output of a subtractor circuit 5.

The weight vector W is computed by the known Wiener formula:

$$W = \hat{R}_{XX}^{-1} \hat{r}_{Xd} \quad (6)$$

with:

$$\hat{R}_{XX} = \frac{1}{K} \sum_{k=1}^{K} X(k) \cdot X^t(k) \quad (7)$$

matrix of correlation of the signals coming from the sensors $1_1$ to $1_N$ ($X^t(k)$ being the conjugate transposed vector of the vector X(k)).

$$\hat{r}_{Xd} = \frac{1}{K} \sum_{k=1}^{K} X(k) d^*(k)$$

correlation vector between X(t) and d(t) (8).

The adaptive antenna thus used leads to a maximizing of the signal-to-noise + interference ratio (SNIR) obtained at output of the antenna with a possibility of rejection that can go up to N−1 jammers, and is called a spatial adaptive filter (SAF).

Figure 3:
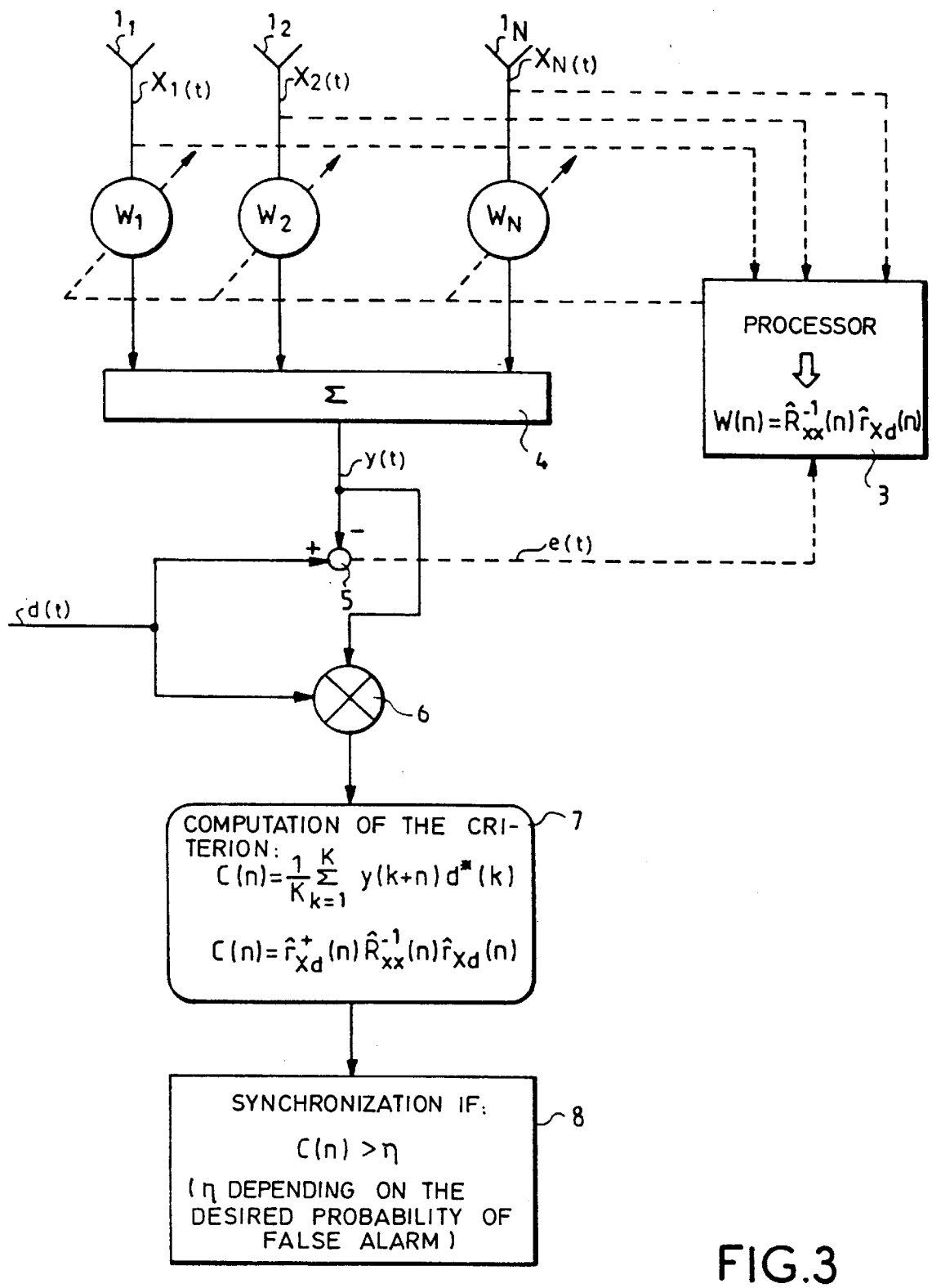
FIG. 3 shows a diagram of an adaptive antenna for the implementation of the spatial synchronization method according to the invention.

The search for synchronization is done according to the invention at the output of the adaptive antenna by discriminating the signal according to its modulation and by using the single-sensor synchronization criterion. The drawing showing the principle of the spatial synchronization is given in FIG. 3 where the elements homologous to those of FIGS. 1 and 2 are shown with the same references. By using the foregoing notations, the criterion of synchronization becomes:

$$C(n) = \frac{1}{K} \sum_{k=1}^{K} y(k+n) d^*(k) \quad (9)$$

y(k+n) represents the output of the adaptive antenna leading to a minimization of the mean square error (n) estimated on K samples between the replica d(k) and the arriving signal taken from the sample n according to the relationship:

$$\hat{\xi}(n) = \sum_{k=1}^{K} |y(k+n) - d(k)|^2 \text{ avec } y(k+n) = W(n)^t \cdot X(k+n) \quad (10)$$

with:

$$W(n) = \hat{R}_{XX}^{-1}(n) \cdot \hat{r}_{Xd}(n) \quad (11)$$

The different correlation values are computed on the K samples that follow the arrival of a sample n according to the relationships:

$$\hat{R}_{XX}(n) = \frac{1}{K} \sum_{k=1}^{K} X(k+n) X^t(k+n) \quad (12)$$

$$\hat{r}_{Xd}(n) = \frac{1}{K} \sum_{k=1}^{K} X(k+n) d^*(k) \quad (13)$$

When the sample n corresponds to the synchronization position, the weights W(n) define the adaptive filter and y(k+n) then contains the useful signal that is rid of the contribution of the jammers. If not, no signal is correlated with the replica d(k) and y(k+n) then no longer contains anything other than the contribution of the background noise.

The expression of the criterion of spatial synchronization is simplified by writing:

$$C(n) = \frac{1}{K} \sum_{k=1}^{K} W(n)^t X(k+n) d^*(k) = W(n)^t \left( \frac{1}{K} \sum_{k=1}^{K} X(k+n) d^*(k) \right) \quad (14)$$

that is:

$$C(n) = \hat{r}_{Xd}^t(n) \hat{R}_{XX}(n)^{-1} \hat{r}_{Xd}(n) \quad (15)$$

Just as in the case of the single-sensor operation, this computation is reiterated for each sample n and when the criterion C(n) goes beyond a certain threshold η, depending on the probably of a false alarm, the synchronization is decided upon (the standardization by the power is obtained herein by means of $R_{XX}$).

The instant of synchronization is then determined by the rank of the sample for which $C(n_0)$ is greater than a determined threshold value η. The corresponding computations are done in FIG. 3 by the block 7 for the computation of the criterion C(n) and by the threshold detector 8, using the synchronization sequence d(t) and the signal y(t) correlated by the correlator 6.

This makes it necessary, for each sample, firstly to compute N correlation values between the replica signal d(k) and the signals x(k) received by the N sensors (giving N times the computations performed by the single-sensor synchronization), and secondly to estimate and then reverse the matrix for the intercorrelation of the sensor signals.

During these computations, the synchronization and the computation of the adaptive filter 2 are done jointly. When the value of the criterion exceeds the computed threshold η, the synchronization is decided and the weight vector defining the filter 2 is easily deduced therefrom from the known Wiener formula. The weight vector W can then be used to filter the samples containing the information.

Assuming that the replica d(t) has a power 1, the correlation values tend towards the following values when the number of samples k becomes very great:

$$\hat{r}_{Xd} \approx \sqrt{\pi_s} \ S$$

$$\hat{R}_{XX} \approx R + \pi_s S S^t$$

where:

R is the matrix correlation of the interference and of the background noise,

S is the matrix of the directional vector of the useful signal, $\pi s$ is the power of the useful signal received on a sensor.

The criterion of synchronization that then converges towards the value $C_0$ is again written as:

$$C_0 = \frac{\pi_s S^t R^{-1} S}{1 + \pi_s S^t R^{-1} S} = \frac{SNIRopt}{1 + SNIRopt} \quad (16)$$

where SNIRopt is the asymptotic SNIR obtained at output of the adapted spatial filter 2.

When the SNIR is high, the criterion tends towards 1. When it is low, it tends to a 0. The chosen magnitude of the threshold $\eta$ fixes the probability of detection of the synchronization. The threshold naturally depends on the desired probability of a false alarm.

Figure 4:
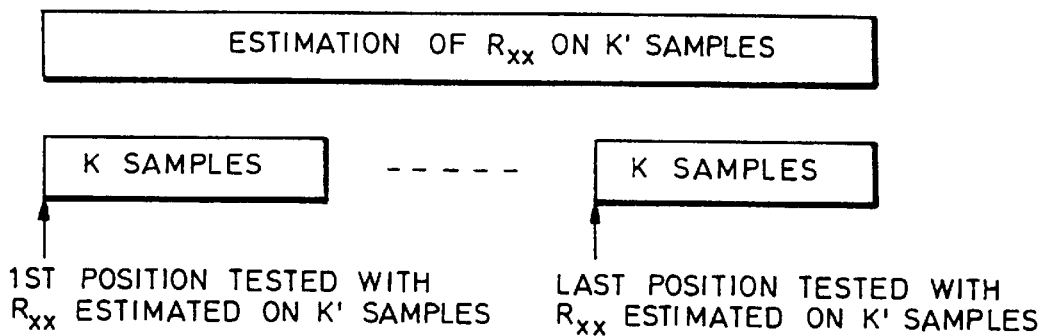
FIG. 4 shows a graph to illustrate the method of estimation of the matrix for the correlation of signals coming from N sensors.

The computation of the synchronization criterion C and of $\hat{r}_{Xd}$ and $\hat{R}_{XX}$ are done for each position of the synchronization and notably the matrix $\hat{R}_{XX}$ is estimated and reversed also for each position of the synchronization. The computing power required is high. However, it is possible to reduce the computing power by estimating the correlation matrix $\hat{R}_{XX}$ less frequently over a greater time interval (K' samples instead of K with K'>K in the way shown in FIG. 4) and by using this estimation of $\hat{R}_{XX}$ on all the synchronization positions included in this time interval.

Under these conditions, the matrix RXX is written t as follows:

$$\hat{R}_{XX} = \frac{1}{K'} \left[ \sum_{k=1}^{K'} B(t_k) B^t(t_k) + \sum_{k=K_0}^{K'} S(t_k) S^t(t_k) \right] + \epsilon \quad (17)$$

where:

$B(t_k)$ is the contribution of the noise and of the jammers on $X(t_k)$, $S(t_k)$ is the contribution of the useful signal on $X(t_k)$, $K_0$ is the instant of appearance of the useful signal on the level stage, $\epsilon$ is a term taking account of the intercorrelation between the signal B(t) and the useful signal S(t) which tends towards 0 when K becomes great.

For the tested position of synchronization:

$$\hat{r}_{Xd} = \frac{1}{K} \left[ \sum_{k=K_0}^{K_0+K} X(t_k) d^*(k) \right] \quad (18)$$

In the asymptotic conditions (with K>>1), when the useful signal is synchronized with a replica d(t), $\hat{R}_{XX}$ and $\hat{r}_{Xd}$ get simplified and are written as follows:

$$\hat{R}_{XX} \approx R + \frac{K' - K_0 + 1}{K'} \pi_s S S^t \quad (19)$$

$$\hat{r}_{Xd} \approx \sqrt{\pi_s} \, S \quad (20)$$

The criterion obtained by estimating the correlation matrix $R_{XX}$ on K' samples has, as an asymptotic value, after a computation using the matrix inversion lemma:

$$C'_0 = \frac{SNIRopt}{1 + \frac{K' - K_0 + 1}{K'} SNIRopt} \quad (21)$$

As $$\frac{K' - K_0 + 1}{K'} < 1,$$

then $C'_0 > C_0$

The value of the criterion thus appears to be increased by a factor depending on the instant of appearance of the useful signal on the frequency considered: this leads to an improvement in the synchronization step itself at the cost of reduced computing power.

Furthermore, the number K' does not have to be chosen such that it is excessively great: its value is determined so that, on K' samples, the jamming environment can be considered to be stationary.

The threshold to be taken into account depends on the probability of a false alarm (Pfa). The (Pfa) is the probability that a noise will be detected as a synchronization. The computation of the threshold value $\eta$ takes place by the computation of Pfa=P(C>$\eta$) when the antenna receives only noise.

In the presence of noise, the synchronization criterion is written as follows:

$$C = \left( \frac{1}{K} \sum_{k=1}^{K} B_k d_k^* \right)^t \left( \frac{1}{K} \sum_{k=1}^{K} B_k B_k^t \right)^{-1} \left( \frac{1}{K} \sum_{k=1}^{K} B_k d_k^* \right) \quad (22)$$

Assuming that $B_k$ is a complex Gaussian noise with a power of $\sigma^2$ that is independent from one sensor to another, when K is sufficiently great, the middle term of the relationship (22) becomes:

$$\left( \frac{1}{K} \sum_{k=1}^{K} B_k B_k^t \right) \approx \sigma^{+2} Id \quad (23)$$

(Id being the identity or unitary matrix)

The criterion of synchronization can then be approximated as follows:

$$C \approx \frac{1}{K^2 \sigma^2} \left( \sum_{k=1}^{K} B_k d_k^* \right)^t \left( \sum_{k=1}^{K} B_k d_k^* \right) \quad (24)$$

that is:

$$C \approx \frac{1}{K^2 \sigma^2} \sum_{i=1}^{N} \left( \left| \sum_{k=1}^{K} B_k^i d_k^* \right|^2 \right) \approx \frac{1}{K^2 \sigma^2} \sum_{i=1}^{N} (R_i^2 + I_i^2) \quad (25)$$

with:

$$\sum_{k=1}^{K} B_k^i d_k^* = R_i + j I_i \quad (26)$$

where:

$B_k^i$ represents the noise obtained on sensor i for the sample k.

$R_i + j I_i$ may be approximated by a complex Gaussian noise with variance K $\sigma^2$. In these conditions $R_i$ and $I_i$ are each real Gaussian noises with a variance $$\frac{K \sigma^2}{2}$$

Noting $T_i = R_i$ or $I_i$, C becomes:

$$C \approx \frac{1}{K^2 \sigma^2} \sum_{i=1}^{2N} (T_i^2) \quad (27)$$

where $T_i$ is a random variable that follows a centered Gaussian distribution law with a variance $$\frac{K\sigma^2}{2}.$$

The random variable:

$$Z_i = \frac{\sqrt{2}}{\sqrt{K\sigma^2}} T_i$$

therefore follows a centered Gaussian distribution law with a variance 1.

C becomes:

$$C \simeq \frac{1}{2K} \sum_{i=1}^{2N} Z_i^2 \qquad (28)$$

Since the sequence of values $Z_i$ may be considered to be a sequence of 2N Gaussian independent random variables with null mean values and variance values of 1, the random variable:

$$\sum_{i=1}^{2N} Z_i^2$$

follows a chi-squared distribution law with 2N degrees of freedom.

The probability of having $C \geq \eta$ is then written as follows:

$$p(C \geq \eta) = p\left( \sum_{i=1}^{2N} Z_i^2 \geq 2K\eta \right) = Pfa \qquad (29)$$

The following table gives different threshold values $\eta$ obtained by a search in a table giving $P(Z \geq A)$ for a chi-squared distribution law with 2N degrees of freedom and for $Pfa = 10^{-5}$.

| N = 5 | ⇒ | A = 42 | ⇒ | η = 0,26 |
| N = 4 | ⇒ | A = 37 | ⇒ | η = 0,23 |
| N = 3 | ⇒ | A = 33 | ⇒ | η = 0,21 |
| N = 2 | ⇒ | A = 28 | ⇒ | η = 0,18 |

Since, between transmission and reception, the transmitted signal may be affected by a certain frequency shift or Doppler shift, essentially due to frequency drifts of the local oscillators of the synthesizers at transmission and at reception as well as to conditions of ionospheric propagation, it is necessary to compensate for this shift. The risk is that if no compensation is provided for this shift, then any step of synchronization will be prevented.

Giving the reference $\Delta fo$ to the Doppler shift between the signal received by the antenna and the expected signal and considering the synchronization position, the received signal vector can be written with the notations of the following paragraphs:

$$X(t) = \sqrt{\pi_s} \ d(t) e^{2j\pi \Delta fo \cdot t} S + B(t)$$

The estimated correlation matrix can then be written as follows:

$$\hat{R}_{XX} = \qquad (30)$$

$$\frac{1}{K} \sum_{k=1}^{K} [\sqrt{\pi_s} \ d(t_k) e^{2j\pi \Delta fo \cdot t_k} S + B(t_k)][\sqrt{\pi_s} \ d(t_k) e^{2j\pi \Delta fo \cdot t_k} S + B(t_k)]^t$$

$$\hat{R}_{XX} = \epsilon + \frac{1}{K} \sum_{k=1}^{K} [\pi_s |d(t_k)|^2 SS^t + B(t_k)B(t_k)^t] \qquad (31)$$

where $\epsilon$ is a matrix taking account of the values of intercorrelation between the contribution of the useful signal and the noise b(t). When K>>1, under asymptotic conditions, $R_{XX}$ can be approximated by:

$$\hat{R}_{XX} \approx \pi_s SS^t = \sigma^2 Id \qquad (32)$$

The relationship (32) shows that the Doppler shift does not modify the computation of $R_{XX}$. Indeed, the shift gets eliminated naturally when the useful signal is multiplied by its conjugate quantity.

The intercorrelation vector can be written as follows:

$$\hat{r}_{Xd} = \frac{1}{K} \sum_{k=1}^{K} [\sqrt{\pi_s} \ d(t_k) e^{2j\pi \Delta fo \cdot t_k} S + B(t_k)] d^*(t_k) \qquad (33)$$

$$\hat{r}_{Xd} = \epsilon' + \frac{1}{K} \sum_{k=1}^{K} [\sqrt{\pi_s} \ |d(t_k)|^2 e^{2j\pi \Delta fo \cdot t_k} S] \qquad (34)$$

where $\epsilon'$ is a term taking account of the intercorrelation between the noise B(t) and the replica. When K>>1, $r_{Xd}$ can be approximated by:

$$\hat{r}_{Xd} \simeq \left[ \frac{1}{K} \sum_{k=1}^{K} \sqrt{\pi_s} \ |d(kT)|^2 e^{2j\pi \frac{\Delta fo}{F_e} k} \right] S \qquad (35)$$

The relationship (34) shows that the Doppler shift modifies the estimation of the intercorrelation vector $r_{Xd}$ and that, since the phase of the term in complex exponential form may rotate by several times 360° in the time interval used to compute the correlation, the integration can no longer take place coherently, thus preventing the multi-sensor synchronization criterion from converging. The following method enables the estimation of the Doppler shift and compensation for this shift in order to enable the synchronization step.

Figure 5:
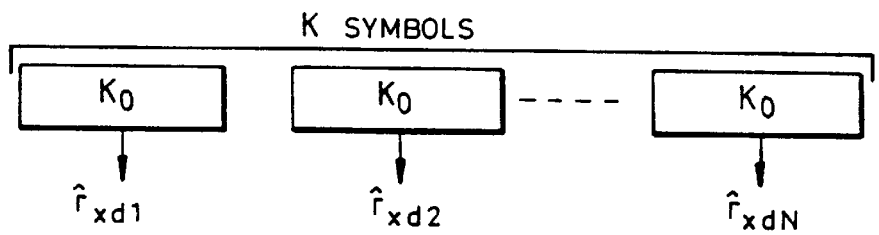
FIG. 5 is a graph to illustrate the subdividing of the symbols of the synchronization sequence into sections for the computation of the intercorrelation vector in the presence of a Doppler shift.

According to this method, the K symbols of the synchronization sequence are subdivided, as shown in FIG. 5; into M sections of $K_0$ symbols (M $K_0$=K) in such a way that, on each of the sections of $K_0$ symbols, the Doppler shift causes a rotation of the phase of the signal received by the antenna by a value of less than 90° in order to enable a coherent integration of $r_{Xd}$ on each of the sections.

If $r_{Xdi}$ designates the intercorrelation value estimated on the section i, this section is written as follows:

$$\hat{r}_{Xdi} \simeq \left[ \frac{1}{K} \sum_{k=iK_0+1}^{(i+1)K_0} \sqrt{\pi_s} \ |d(kT)|^2 e^{2j\pi \frac{\Delta fo}{F_e} k} \right] S \qquad (36)$$

$$i = 0, \ldots, M - 1$$

By placing, as a factor in the relationship (36), a term that depends solely on $K_0$, the length of the elementary section and the Doppler shift, the relationship (36) becomes:

$$\hat{r}_{Xdi} \simeq \qquad (37)$$

$$\left[ \frac{1}{K} \sum_{k=1}^{K_0} \sqrt{\pi_s} \ |d((k+jK_0)T)|^2 e^{2j\pi \frac{\Delta fo}{F_e} k} \right] e^{2j\pi \frac{\Delta fo}{F_e} \cdot iK_0} \cdot S$$

$$i = 0, \ldots, M - 1$$

This can again be written as:

$$\hat{r}_{Xdi} \approx x_i e^{2j\pi \cdot \frac{\Delta F_0}{F_e} \cdot iK_0} \cdot S \quad i = 0, \ldots, M-1 \quad (38)$$

The relationship (38) shows that the vectors $r_{Xdi}$ are vectors, sampled at $$\frac{F_e}{K_0}.$$

Their discrete Fourier transform is then:

$$\hat{r}_{Xd}(\Delta f) \approx \sum_{i=0}^{M-1} \hat{r}_{Xdi} e^{-2j\pi \cdot \frac{\Delta f}{F_e/K_0} \cdot i} \quad (39)$$

$$\hat{r}_{Xd}(\Delta f) \approx \sum_{i=0}^{M-1} x_i e^{2j\pi \cdot \frac{\Delta f_0 - \Delta f}{F_e} \cdot iK_0} S \quad (40)$$

The relationship (40) shows that when $\Delta f = \Delta f_0$, the Doppler shift is compensated for, thus maximizing the value of the criterion of synchronization $\hat{r}_{Xd}(\Delta f)' R_{XX}^{-1} \hat{r}_{Xd}(\Delta f)$.

In order to estimate $\Delta f$, namely in order to estimate the Doppler shift that leads to the maximum value of the criterion and in order to reduce the corresponding cost of computation, a fast Fourier transform is performed on the vectors $r_{Xdi}$ (the number of elementary sections M being chosen to form a power of 2): this computation gives:

$$\hat{r}_{Xd}(k\Delta f_1) \approx \sum_{i=0}^{M-1} \hat{r}_{Xdi} e^{-2j\pi \cdot \frac{\Delta f_1}{F_e/K_0} \cdot ik} \approx \sum_{i=0}^{M-1} \hat{r}_{Xdi} e^{-2j\pi \frac{ik}{M}} \quad (41)$$

$$k = 0, \ldots, M-1$$

where $\Delta f_1$ is the Doppler resolution such that:

$$\Delta f_1 = \frac{F_e/K_0}{M} \quad (42)$$

If the resolution is insufficient, an improvement of a factor 2 may be obtained by computing a fast Fourier transform on the frequency-shifted vectors $r_{Xdi}$ as follows:

$$\hat{r}_{Xd}\left(k\Delta f_1 + \frac{\Delta f_1}{2}\right) \approx \sum_{i=0}^{M-1}\left(\hat{r}_{Xdi} e^{-j\pi \frac{ik}{M}}\right) e^{-2j\pi \frac{ik}{M}} \quad (43)$$

$$k = 0, \ldots, M-1$$

The operation consists in multiplying each of the intercorrelation vectors $r_{Xdi}$ by the term $e^{-(j\pi/M)}$ and in then carrying out a fast transform computation on the vectors thus obtained.

The criterion of synchronization is then estimated on each of the preceding cases of Fourier transform computation by the relationship:

$$C\left(k\frac{\Delta f_1}{2}\right) = \hat{r}_{Xd}\left(k\frac{\Delta f_1}{2}\right) R_{XX}^{-1} \hat{r}_{Xd}\left(k\frac{\Delta f_1}{2}\right) \quad (44)$$

$$k = 0, \ldots, 2M-1$$

Naturally, if the resolution is still insufficient, it can be improved by using the same process to compute vectors $$\hat{r}_{Xd}\left(k\Delta f_1 + \frac{\Delta f_1}{n}\right)$$

where n is any whole number.

A test on the case of the transform corresponding to the maximum of the synchronization criterion is done. If the threshold is exceeded for a given value $$k_0 \frac{\Delta f_1}{2}$$

of the Doppler shift, then it is possible to make the computation of the Doppler shift more precise (this is indispensable for the modulation) by computing the value of the criterion for different Doppler shift values surrounding $$k_0 \frac{\Delta f_1}{2}.$$

Indeed, at the end of this stage, the resolution on the estimation of the Doppler shift is $$\frac{\Delta f_1}{2}.$$

Figure 6:
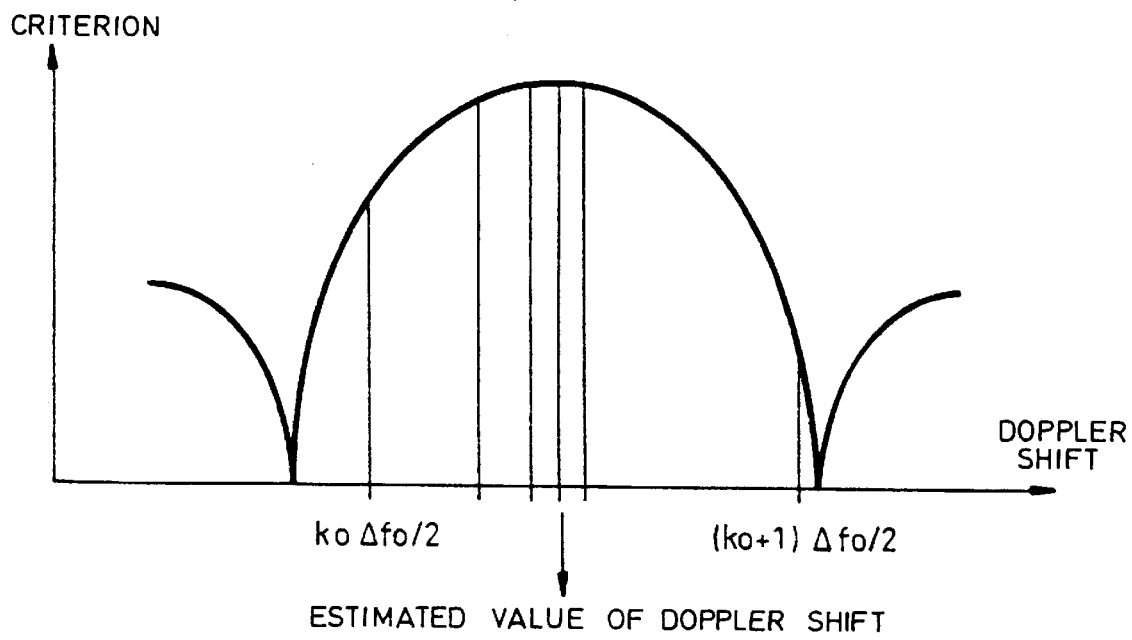
FIG. 6 is a graph showing the development of the criterion of synchronization implemented by the invention in the presence of a Doppler shift.

To improve it, it is necessary to proceed by a method of dichotomy: at each iteration and in the way shown in FIG. 6, a computation is made of the value of the criterion for the Doppler shift value located in the middle of the two Doppler shift values giving the maximum values of the criterion during the previous iteration. The search by the method of dichotomy is stopped as soon as the desired resolution for the estimation of the Doppler shift is obtained. After n iterations of this dichotomy search algorithm, the resolution which was initially equal to $$\frac{\Delta f_1}{2}$$

is:

$$\frac{\Delta f_1/2}{2^n} = \frac{\Delta f_1}{2^{n+1}} \quad (45)$$

Figure 7:
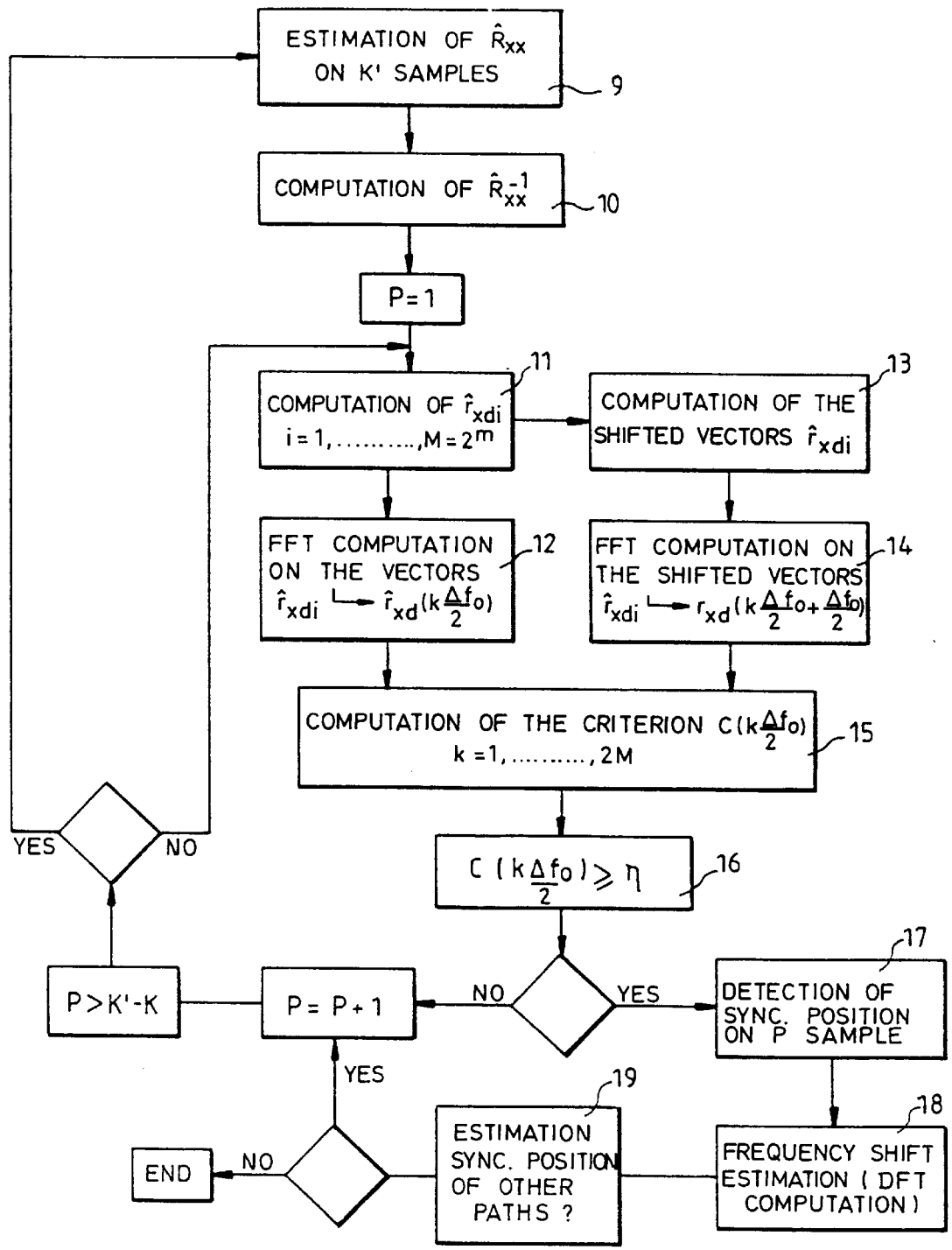
FIG. 7 is a flow chart outlining all the steps needed to implement the synchronization method according to the invention.

The sequencing of the above computation steps for the implementation of the method according to the invention, using appropriate processing means formed for example by signal processors or any known equivalent device, is shown in the flow chart of FIG. 7.

It consists, according to the step 9, in estimating the correlation matrix $\hat{R}_{XX}$ following the relationship (7). This matrix is estimated on a block containing a number of samples K' greater than the number of samples of the synchronization sequence.

The estimation of RXX is then used for all the positions of synchronization included in the block. Then the reverse correlation matrix $\hat{R}_{XX}^{-1}$ is computed in the step 10. $\hat{r}_{Xdi}$ which is defined by the relationship (8) is computed in the step 11. For each sample corresponding to a position of synchronization P in a sequence of samples P=1 to P=K'-K, $\hat{r}_{Xdi}$ is computed for i=1 to M on M blocks of $K_0$ symbols as defined in FIG. 5 according to the relationship:

$$\hat{r}_{Xdi} = \frac{1}{K_0} \sum_{K=1}^{K_0} X(P + K + iK_0) d^*(K + iK_0) \quad (46)$$

Fast Fourier transform computations are performed in the next step 12 on a determined number M (M=8 for example) of vectors $\hat{r}_{Xdi}$ according to the relationship (41).

In the steps 13 and 14, a computation of a shifted vector $\hat{r}_{Xdi}$ and a fast Fourier transform computation according to the relationship (43) are performed to improve the resolution by a factor of 2.

The criterion of synchronization is computed in the step 15 by application of the relationship (44).

The comparison of the criterion or threshold η is done in the step 16. If, in the step 16, the value of the criterion $$C\left(\frac{KDf_1}{2}\right) \quad (5)$$

is greater than or equal to the threshold, the position of synchronization is defined in the step 17 on the position P of the corresponding sample. The estimation of the Doppler shift can then be made more precise in step 18 by a renewed computation of the value of the criterion of synchronization for the Doppler shift surrounding the preceding shift $$\left(K_0\frac{\Delta f_1}{2}\right).$$

This step may be followed by a step 19 for the estimation of the position of synchronization for the other paths.

The above-described search for synchronization is done for each of the samples of digitized signals. In practice, to improve the precision of the position of the synchronization, it is preferable to carry out an oversampling of the signal by a determined factor L, L being equal to 4 for example. The above-described processing operations of the flowchart of FIG. 7 can again be used on the signal thus oversampled but it is possible to use a variant in the method in order to reduce the computing power needed for the processing. Under these conditions, after the computation, for each sample, of the vector $\hat{r}_{Xdi}$ for i=1, . . . , M on M blocks of $K_0$ symbols according to the relationship (46), a synchronization criterion $C_i$ is computed on each of the M blocks by the relationship:

$$C_i = \hat{r}_{Xdi}{}^t \cdot R_{XX}{}^{-1} \cdot \hat{r}_{Xdi} \quad (47)$$

Then, a sum criterion on all the $C_i$ values is computed according to the relationship:

$$C_1(P) = \sum_{i=1}^{M} C_i \quad (48)$$

This criterion corresponds to a non-coherent integration of the Ci value (unlike what is done for the FFT computation where integration is done coherently), resulting in a tracing back of the criterion to the noise samples.

The criterion is computed by blocks of L consecutive samples. On each of these blocks, the sample that gives the maximum value of $C_1(P)$ is selected to carry out the fast Fourier transform computation needed to estimate the Doppler shift as already described in the steps 11 to 19 of FIG. 7.

What is claimed is:

1. A method enabling a modem to be synchronized with an RF digital signal transmitter in the presence of jammers comprising the steps of:
   estimating the matrix of correlation $\hat{R}_{XX}$ of signals received on a set of N reception sensors ($1_1 \ldots 1_N$) by blocks formed by a number of samples of a synchronization sequence transmitted by the transmitter,
   computing the reverse correlation matrix $\hat{R}_{XX}^{-1}$,
   computing vectors of intercorrelation $\hat{r}_{Xd}$ between the signals X(k) received on the set of the N sensors and a known replica signal d(k),
   computing a criterion of synchronization calculating the scalar product between the intercorrelation vector $r_{Xd}$ and the vector obtained by the product of the inverse of the correlation matrix $\hat{R}_{XX}^{-1}$ and the intercorrelation vector $r_{Xd}$,
   comparing the value of the criterion obtained with a determined threshold value η to place the synchronization on the sample for which the value of the criteria exceeds the threshold value η, wherein, in order to estimate the Doppler shift inherent in the communications between transmitters and receivers, said method comprises the steps of:
   subdividing the synchronization sequence into a determined number of M sections of $k_0$ symbols,
   carrying out computations, on these sections, of partial intercorrelation vectors $\hat{r}_{Xd}$ (i=1, . . . ,M) in such a way that, on each of the sections of $k_0$ symbols, the Doppler shift causes the phase to rotate by a value of less than 90°,
   carrying out fast Fourier transform (FFT) computations on the vectors $\hat{r}_{Xdi}$ obtained,
   and computing a value of the synchronization criterion from the vectors $r_{Xd}(k\Delta f)$, obtained as a result of the fast Fourier transform computations and the correlation matrix $\hat{R}_{XX}$.

2. A method according to claim 1, wherein the estimation of the correlation matrix $\hat{R}_{XX}$ is obtained by the relationship $$\hat{R}_{XX} = \frac{1}{K} \sum_{k=1}^{K} X(k) \cdot X_{(k)}^T$$

and the intercorrelation vector is estimated according to the relationship, $$r_{Xd} = \frac{1}{K} \sum_{k=1}^{K} X_{(k+p)} d^*{}_{(k)}$$

where P is the position of the first sample from which the correlation is done between the vector X and the replica d.

3. A method according to claim 2, consisting in choosing the case of computation of the fast Fourier transform that gives a maximum value of the synchronization criterion and in comparing the maximum value obtained with a determined threshold value to decide on the synchronization.

4. A method according to claim 3 wherein, to obtain an improved resolution on the Doppler shift and a greater value of the maximum of the criterion, comprising in computing frequency-shifted vectors $r_{Xdi}$ and in performing an FFT computation on the shifted vectors $r_{Xdi}$ so as to obtain the value of the criterion with higher resolution on the Doppler frequencies.

5. A method according to claim 4, consisting in oversampling the signals received on the N sensors with respect to the symbol rate to improve the resolution on the synchronization position.

6. A method according to claim 5, consisting in computing the correlation matrix $R_{XX}$ on a number of samples K' greater than the number K of samples of the synchronization sequence in order to reduce the computing power.

7. A method according to claim 6 wherein, in order to reduce the computing power and after having carried out an oversampling by a factor L with respect to the symbol rate, comprising in carrying out a pre-treatment step consisting of the computation, for each sample p (p=1 to L) forming a symbol, of the values Ci of the criterion of synchronization on each of the M sections of k0 symbols and computing the value of the criterion by taking the sum of the criteria Ci obtained to keep, in the processing sequence, the sample giving the maximum value of the criterion:

$$C = \Sigma ci.$$

8. A device enabling a modem to be synchronized with an RF digital signal transmitter in the presence of jammers, comprising a network of N sensors ($1_1 \ldots 1_N$) of reception signals coupled with an array of adaptive filters comprising amplitude-phase weighting circuits controlled by a control processor, the control processor being programmed to:

estimate the inverse matrix of correlation $\hat{R}_{XX}^{-1}$ of the received signals X(K) and compute the vectors of intercorrelation $\hat{r}_{Xd}$ between the signals X(k) and the replica signal d(k), said device comprising processing means to compute a criterion of synchronization in calculating the scalar product between the intercorrelation vector $r_{Xd}$ and the vector obtained by the product of the inverse of the correlation matrix $R_{XX}^{-1}$ and the intercorrelation vector $\hat{r}_{Xd}$, compare the value of the criterion obtained with the threshold value η to place the synchronization on the sample for which the value of the criteria exceeds the threshold value η, and estimate the Doppler shift inherent in the communications between transmitters and receivers by:

subdividing the synchronization sequence into a determined number of M sections of $k_0$ symbols, carrying out computations, on these sections, of partial intercorrelation vectors $\hat{r}_{Xd}$ (i=1 , . . . , M) in such a way that, on each of the sections of $k_0$ symbols, the Doppler shift causes the phase to rotate by a value of less than 90°, carrying out fast Fourier transform (FFT) computations on the vectors $\hat{r}_{Xdi}$ obtained, and computing a value of the synchronization criterion from the vectors $r_{Xd}(k\Delta f)$, obtained as a result of the fast Fourier transform computations and the correlation matrix $\hat{R}_{XX}$.

* * * * *